No. 625,399. Patented May 23, 1899.
J. KOLARIK & C. WERDER.
MILK SAMPLER.
(Application filed Feb. 6, 1899.)
(No Model.)
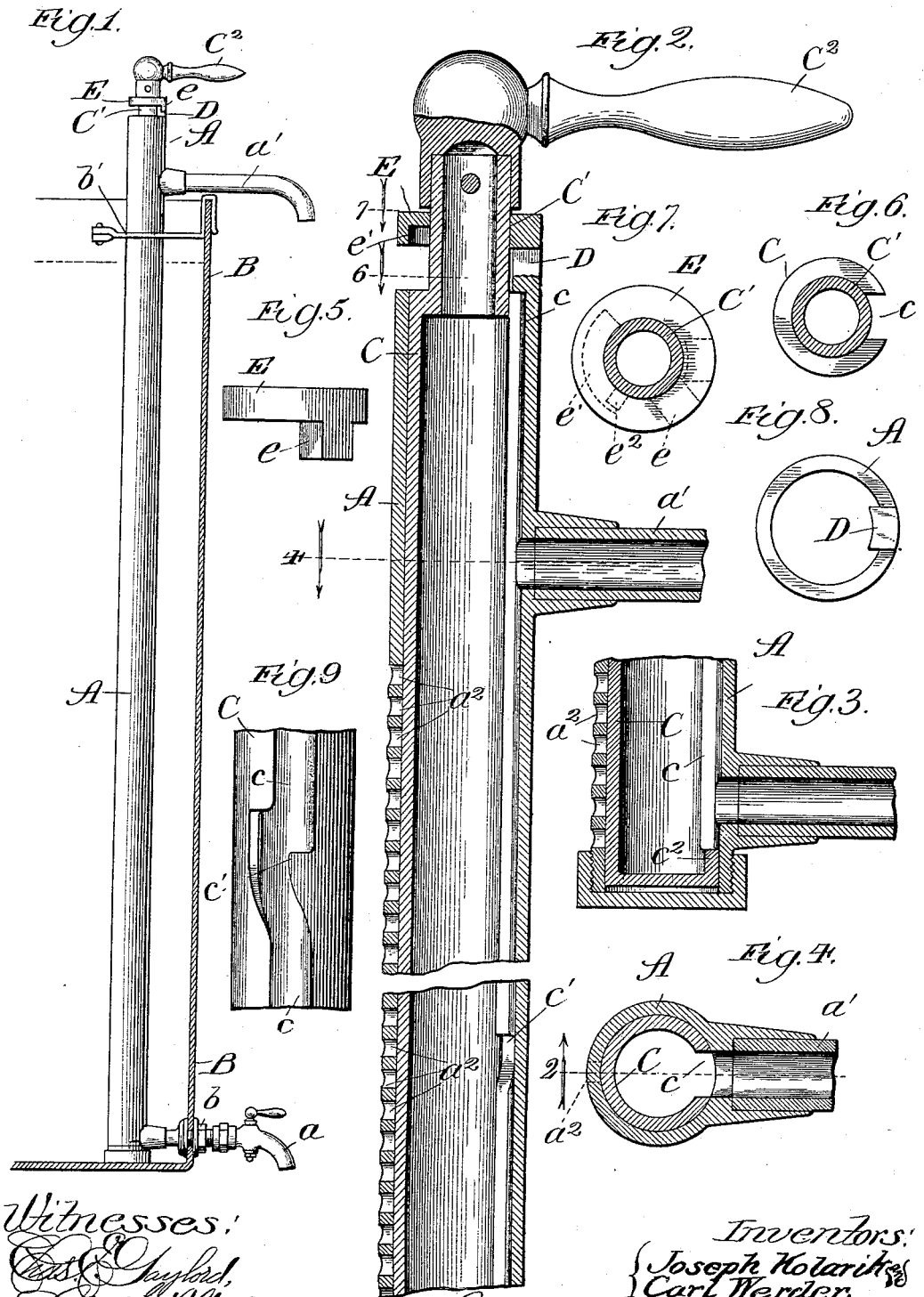

UNITED STATES PATENT OFFICE.

JOSEPH KOLARIK, OF CHICAGO, ILLINOIS, AND CARL WERDER, OF EAGLE, SOUTH DAKOTA.

MILK-SAMPLER.

SPECIFICATION forming part of Letters Patent No. 625,399, dated May 23, 1899.

Application filed February 6, 1899. Serial No. 704,677. (No model.)

*To all whom it may concern:*

Be it known that we, JOSEPH KOLARIK, a citizen of the United States, residing at Chicago, Cook county, Illinois, and CARL WERDER, a citizen of the Swiss Republic, residing at Eagle, Brule county, South Dakota, have invented certain new and useful Improvements in Milk-Samplers, of which the following is a specification.

Our invention relates to that class of apparatus which is used or intended to be used in connection with creamery weigh-cans or other milk vessels for the purpose of obtaining a sample of the milk from the top to the bottom of the can.

The object of the invention is to provide a simple, economical, and efficient milk-sampler; and the invention consists in the features, combinations, and details of construction hereinafter described and claimed.

In the accompanying drawings, Figure 1 is a side elevation of our improvement as attached to a milk vessel for the purpose of obtaining a sample of the milk contained therein; Fig. 2, an enlarged vertical sectional view of the upper portion of the sampler, taken on line 2 of Fig. 4; Fig. 3, an enlarged sectional elevation of the lower portion of the sampler, taken through the longitudinal center thereof; Fig. 4, a cross-sectional view taken on line 4 of Fig. 2; Fig. 5, an elevation of the stop-collar for determining the position of engagement of the different parts of the sampler. Figs. 6 and 7 are cross-sectional views taken on lines 6 and 7 of Fig. 7; Fig. 8, a plan view of the upper portion of the sampler-casing, and Fig. 9 a detail view hereinafter described.

In the art to which this invention relates, and particularly when used in connection with creamery weigh-cans, it is well known that it is desirable to obtain a perfect sample of the milk contained in such weigh-cans. Ordinarily the milk is poured in so that the cream and skim-milk are thoroughly mixed, and in order to obtain a fair sample it is necessary to obtain a sample through every successive layer of the milk from the top to the bottom. This is also a desideratum when the cream is on the top of the milk and the skim-milk below the cream. Otherwise a perfect sample of the milk could not be obtained, as if it were ladled out at the top cream only could be obtained. Our invention is therefore intended, primarily, to provide an apparatus by which a column of the milk may be obtained which extends from the top to the bottom of the milk as contained in the vessel and used as a sample. Further objects of the invention will be apparent from an examination of the drawings and the following description and claims.

In constructing an apparatus in accordance with our improvements we make a cylindrical casing A of the desired size, shape, and strength. This casing is preferably provided with a discharge-faucet $a$ at the lower part and with a discharge-faucet $a'$ at the upper part for the purpose of allowing the milk to flow out through the same, as will be more fully hereinafter described. To secure the casing to a milk vessel of any description, the lower faucet may be passed through an opening in the vessel B and clamped thereto by means of the clamping-nuts $b$, while a spring-clamp $b'$ may be used to hold the upper part of the sampler-casing in position and prevent it from being moved other than as desired. This cylindrical sampler-casing is provided with a number of inlet-perforations $a^2$, which extend therethrough transversely, so as to permit a quantity of milk to flow inside whenever desirable or necessary.

In order to obtain a sample of the milk, a central cylindrical portion C is provided, which is preferably formed of a tube having a vertical longitudinal slit $c$ therein, which extends from the bottom to the top thereof. This central cylindrical portion is preferably reduced in diameter at the upper part at $C'$ and provided with a handle $C^2$, so that the longitudinal slit in the same may be cut through and not enter the upper part or neck thereof.

It will be seen from the foregoing that when the slit is brought around adjacent to the inlet-perforations $a^2$ in the casing a portion of the milk contained in the milk vessel will enter the tube or slit from the top to the bottom portion thereof, and thus provide a column of milk of the same density and quality as contained in the main body of the milk. It may be now desirable to draw off this column of milk in the sampler without permitting a fresh supply to enter the same. In order to accomplish this result and as will be noticed from an examination of Fig. 2, the longitudinal slit $c^2$ may be rotated, so as to be brought into alinement with both of the discharge-faucets and the sample of milk withdrawn from either. By opening the faucet $a$ the column of milk will be discharged through such opening into any desired test-jar and stored therein. If desired to draw the sample of milk out through the upper faucet, the lower faucet must be closed and the inner tube raised. During the raising of the inner tube, with the slot always coincident with the faucet $a'$, the column of milk will be discharged as the tube is raised through the upper faucet into any desired test vessel.

It is desirable that some means be provided by which the operator will be enabled to always bring the longitudinal slit in the inner portion into alinement with both of the discharge-faucets. In order to accomplish this result, the outer casing is provided with an upwardly-projecting portion D, which also projects inwardly, as shown in Figs. 1 and 8, and is adapted to engage with the longitudinal slot. A dog or loose stop-collar E is provided, which is mounted on the neck of the inner portion and has a downwardly-projecting portion $e$, adapted to engage with the projection on the outer casing. This collar is also recessed at $e'$ to engage with a pin $e^2$ on the neck portion of the sampler and which acts to loosely support said collar. It will thus be seen that by turning the inner portion of the sampler in either direction, so that the downwardly-projecting portion of the collar may contact the upwardly-projecting portion on the outer casing, the longitudinal slot of the inner portion will always be brought into alinement with the faucets. From this construction and arrangement it will be seen that when the inner tube is rotated the pin $e^2$, which supports the loose collar, rotates until it abuts against either wall of the recess $e'$. Then the collar rotates with the same until the downward-projecting portion $e$ of the collar abuts against the projecting lug D, and no matter which way the inner tube is rotated it will be brought to a stop when its longitudinal slot is in alinement with the discharge-openings. The longitudinal slot in the inner portion does not extend quite to the bottom, as is shown in Fig. 3, so that it enables the inner portion to lift the sample column of milk. It is desirable, therefore, that some means be provided by which the central portion may be limited in its upward movement until the entire column of milk is discharged through the upper faucet. In order to accomplish this result, we provide an offset in the longitudinal slot or make a portion of it in an irregular shape, so as to provide a shoulder $c'$, as shown in Fig. 2. When the inner portion has been raised so that the shoulder $c'$ contacts the projection D, the lower part $c^2$ of the inner portion is opposite the upper faucet and can be held there until all of the sample column of milk has been discharged. By slightly turning the inner portion this shoulder is avoided, and the inner portion can be raised and removed whenever desired to cleanse the parts.

While we have described our invention with more or less minuteness as regards details of construction and arrangement and as being embodied in certain precise forms, we do not desire to be limited thereto unduly or any more than is pointed out in the claims. On the contrary, we contemplate all proper changes in form, construction, and arrangement, the omission of immaterial elements, and the substitution of equivalents as circumstances may suggest or necessity render expedient.

We claim—

1. In an apparatus of the class described, the combination of an outer casing provided with inlet and outlet openings, and an inner portion provided with a longitudinal groove or slot adapted to be brought into alinement with the inlet and outlet for the purpose of removing the column of liquid which may be contained therein, substantially as described.

2. In an apparatus of the class described, the combination of a cylindrical tube provided with inlet and outlet perforations or openings, and a vertically-movable tube rotatably mounted in the cylindrical tube and provided with a longitudinal groove or slot adapted to be brought into alinement with the inlet and outlet openings for the purpose of obtaining a sample of milk or discharging the same, substantially as described.

3. In an apparatus of the class described, the combination of a cylindrical tube forming a casing provided with inlet-perforations and a discharge opening or openings, and an inner tubular portion provided with a longitudinal groove or slot adapted to be brought into alinement with the inlet-perforations and the discharge opening or openings for the purpose of obtaining or discharging a sample of milk, substantially as described.

4. In an apparatus of the class described, the combination of a cylindrical tube forming a casing provided with inlet and discharge openings, an inner tubular portion vertically and movably mounted in the same provided with a longitudinal groove or slot adapted to be brought into alinement with the inlet and discharge openings for the purpose of obtaining or discharging a sample of milk, and stop mechanisms for limiting the rotary movement of the inner part so as to cause the alinement of the longitudinal groove or slot through the discharge opening or openings, substantially as described.

5. In an apparatus of the class described, the combination of a cylindrical tube forming a casing provided with transverse inlet-perforations and a discharge opening or openings, an inner tubular portion vertically and movably mounted in the same provided with a longitudinal groove or slot adapted to be brought into alinement with the transverse inlet-perforations and the discharge opening or openings for the purpose of obtaining or discharging a sample of milk, a projection on the outer casing, and a loose stop-collar on the inner portion adapted to contact the projection and position the parts so as to cause the alinement of the longitudinal slot or groove and the discharge opening or openings, substantially as described.

6. In an apparatus of the class described, the combination of an exterior cylindrical tube forming a casing provided with transverse inlet-perforations, a discharge-opening at or near the bottom portion and a discharge-opening at or near the top portion, an inner tubular portion vertically and movably mounted in the same and provided with a longitudinal slot or groove, and stop mechanism for causing the alinement of the longitudinal slot or groove and the discharge-openings, substantially as described.

7. In an apparatus of the class described, the combination of an exterior tubular portion forming a casing provided with transverse inlet-perforations, a discharge-opening at or near the bottom and a discharge-opening at or near the top, an inner tubular portion vertically and movably mounted on the same and provided with a longitudinal groove or slot, a projection on the exterior portion adapted to engage the longitudinal groove or slot to keep the same in alinement with the discharge-openings, a collar on the inner portion adapted to engage the projection on the exterior portion to cause the alinement of the slot and the discharge-openings, and an offset or projection in the longitudinal groove or slot to limit the upward movement of the same so as to keep the lower portion of such groove or slot in alinement with the upper discharge-opening of the exterior portion, substantially as described.

JOSEPH KOLARIK.
CARL WERDER.

Witnesses to the signature of Joseph Kolarik:
    THOMAS F. SHERIDAN,
    THOMAS B. MCGREGOR.

Witnesses to the signature of Carl Werder:
    JOHN LINKA,
    JOSEPH FORMAN.